United States Patent
Corcione et al.

(10) Patent No.: US 6,853,893 B2
(45) Date of Patent: Feb. 8, 2005

(54) ELECTRONIC CONTROL SYSTEM FOR TORQUE DISTRIBUTION IN HYBRID VEHICLES

(75) Inventors: Giuseppe Esposito Corcione, Marigliano (IT); Gianguido Rizzotto, Civate (IT); Gianluca Vitale, Guagnano (IT); Tommaso Novia, Naples (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/696,741

(22) Filed: Oct. 29, 2003

(65) Prior Publication Data

US 2004/0117078 A1 Jun. 17, 2004

(30) Foreign Application Priority Data

Oct. 29, 2002 (EP) ............................................. 02425654

(51) Int. Cl.⁷ ............................................... G06F 7/00
(52) U.S. Cl. .............................. 701/22; 701/40; 701/57; 701/58; 701/84; 701/101; 180/65.8
(58) Field of Search ............................. 701/22, 33, 36, 701/40, 57, 58, 84, 101; 180/65.2, 65.4, 65.8

(56) References Cited

U.S. PATENT DOCUMENTS

| | | | | |
|---|---|---|---|---|
| 5,428,531 A | * | 6/1995 | Hayafune ..................... | 701/65 |
| 5,786,640 A | | 7/1998 | Sakai et al. .................... | 290/17 |
| 5,826,671 A | * | 10/1998 | Nakae et al. ............... | 180/65.2 |
| 5,845,731 A | * | 12/1998 | Buglione et al. .......... | 180/65.2 |
| 5,865,263 A | * | 2/1999 | Yamaguchi et al. ....... | 180/65.2 |
| 6,026,921 A | * | 2/2000 | Aoyama et al. ........... | 180/65.2 |
| 6,164,400 A | | 12/2000 | Jankovic et al. ........... | 180/65.2 |
| 6,188,945 B1 | | 2/2001 | Graf et al. .................... | 701/58 |
| 6,301,529 B1 | | 10/2001 | Itoyama et al. ................ | 701/22 |
| 6,307,276 B1 | | 10/2001 | Bader ........................ | 290/40 C |

FOREIGN PATENT DOCUMENTS

| | | | | |
|---|---|---|---|---|
| DE | 19537257 | 4/1996 | ............ | G01B/5/20 |
| DE | 19648055 | 6/1998 | ........... | B60K/41/00 |
| DE | 10035027 | 1/2002 | ........... | B60K/41/00 |
| EP | 0739772 | 10/1996 | ........... | B60L/11/12 |
| EP | 0822114 | 2/1998 | ........... | B60L/11/12 |

OTHER PUBLICATIONS

Lee et al., Fuzzy–Logic–Based Torque Control Strategy for Parallel–Type Hybrid Electric Vehicle, IEEE Transactions on Industrial Electronics, IEEE Inc. New York, US, vol. 45, No. 4, Aug. 1, 1998, pp. 625–632, XP000774981.

Koo et al., Torque Control Strategy for a Parallel Hybrid Vehicle Using Fuzzy Logic, Industry Applications Conference, 1998, Thirty–Third IAS Annual Meeting, The 1998 IEEE St. Louis, MO, US, Oct. 12–15, 1998, New York, US, Oct. 12, 1998, pp. 1715–1720, XP010312912.

\* cited by examiner

Primary Examiner—Gertrude A. Jeanglaude
(74) Attorney, Agent, or Firm—Lisa K. Jorgenson; Allen, Dyer, Doppelt, Milbrath & Gilchrist, P.A.

(57) ABSTRACT

An electronic torque control and distribution system is provided for a hybrid propulsion vehicle. The drive thrust of the hybrid propulsion vehicle is distributed between an electric engine and an internal combustion engine through a transmission system. The transmission system delivers the torque of both engines to the vehicle wheels. The electronic torque control and distribution system is slaved to a control unit, and includes a controller for incorporating a fuzzy logic processor to predict through soft computing techniques the torque contributions of the electric engine and of the internal combustion engine. A sensor estimates the vehicle polluting emissions. The controller and the sensor are both connected to the control unit.

33 Claims, 7 Drawing Sheets

ELECTRONIC CONTROL SYSTEM FOR TORQUE DISTRIBUTION IN HYBRID VEHICLES

FIELD OF THE INVENTION

The present invention relates to an electronic torque control and distribution system for hybrid propulsion vehicles. More specifically, the present invention relates to a hybrid propulsion vehicle wherein the drive thrust is distributed between an electric engine and an internal combustion engine through a transmission system delivering the torque of both engines to the vehicle wheels and being slaved to a control unit.

BACKGROUND OF THE INVENTION

The present invention is an improvement of what has been described in European Patent Application No. 01830645.6, which is incorporated herein by reference and is assigned to the current assignee of the present invention. The growing interest shown by the international community for the decrease of air pollutants has led to the issuing of more and more severe regulations concerning automobile vehicle polluting emissions.

In particular, the European Union plans to implement within 2005 severe restrictions on exhaust emissions and fuel consumption of internal combustion engines. The most significant regulations are briefly described below, and some of them are already in force while others are pending:

Euro III (98/69): vehicles registered from Jan. 1, 2001 comply with this directive. Besides the problem of pollutant emission, which is lower than the previous ones, this directive introduces the requirement of an on board autodiagnostic system OBD (On Board Diagnostic), indicating any malfunction. It is compulsory to do the repair within a determined number of kilometers, otherwise harsh sanctions are applied. These directives, which are valid for petrol cars, will come into force in 2003 for diesel engines.

Euro IV (98/68 B): it will come into force on Jan. 1, 2005.
Euro V (2001/27/EC): it will come into force on Jan. 1, 2008.

Vehicle emissions highly depend on the rotational speed due to the engine use, such as driving in the city, in the country or on a freeway, for example. In the future, compliance with these regulations will involve a considerable effort by car producers in developing low emission vehicles. In this point of view, hybrid propulsion vehicles will play a leading role in consideration of both the more developed technology and the low emissions, but also of the lower consumption.

The prior art already provides some configurations of hybrid propulsion vehicles, i.e., vehicles equipped with an electric engine and an internal combustion engine. The two conventional hybrid vehicle configurations are the series configuration and the parallel configuration.

In the series configuration the internal combustion engine runs at a peak efficiency steady state to recharge the storage batteries powering the electric engine. Essentially, the engine operates as a generator and it is sized according to the drive-demanded average power.

It is evident that this power value is considerably lower than the highest deliverable power. Therefore, under such conditions, the internal combustion engine operates at a torque curve point having the highest efficiency and wherein polluting emissions are reduced to a minimum.

In this configuration, the electric machine mounted in a vehicle runs mainly as an engine, and runs as a generator only during the regenerative braking steps. The electric machine rating must be equal to the vehicle rating, since the drive demanded power is supplied only by the electric engine.

The drawbacks of this configuration are represented by the batteries which, having to be sized according to the electric machine rating, will be characterized by considerable size and weight, negatively affecting the vehicle performances. FIG. 1 shows in schematic blocks the structure of a hybrid propulsion vehicle of the previously described series type.

In the parallel configuration the internal combustion engine runs dynamically (not at a fixed point) and it contributes, together with the electric drive, to supply the required mechanical power. Generally, the internal combustion and electric engine contributions are delivered to the wheel axis through a torque conversion mechanical coupling.

The total vehicle power is thus distributed between the electric engine and the internal combustion engine. Therefore, the latter power is lower than the one of a conventional vehicle engine, in consideration also of the possible electric machine overload.

The efficiency and the polluting emissions are optimized through an adequate control of the radiant flux distribution among the main components. The electric engine has a limited power and it operates also as a generator to recharge the batteries. The batteries have a reduced size and weight since they power a reduced power electric engine. FIG. 2 shows in schematic blocks the structure of a parallel-type hybrid propulsion vehicle.

Both of the above described series/parallel configurations have advantages and disadvantages. In the series configuration hybrid system the internal combustion engine only functions for the battery charge, therefore the high energy density of fossil fuels cannot be exploited. Moreover, the high weight of the storage batteries causes a considerable increase in the vehicle inertia and this damages the equal power performances.

Also, the need to use two different electric machines, the one for the drive and the other for the storage battery recharge, increases the system complexity to the detriment of reliability. On the contrary, the parallel configuration hybrid system requires controllers or mechanical elements allowing the overall torque required to be distributed between the thermal engine and the electric engine.

The torque distribution methods according to the prior art do not ensure a global optimization of power output but only an optimization linked to contingent situations. To obtain a global optimization, not only the path that will be covered by the vehicle but also all the driving conditions that will appear should be previously known in principle.

Another possible approach should be to make forecasts based on the past system history with probabilistic behavior evaluations. Nevertheless, this approach is difficult to implement and it would not lead to particularly interesting results from an industrial point of view.

SUMMARY OF THE INVENTION

An object of the present invention is to provide an electronic torque control and distribution system, particularly for hybrid propulsion vehicles, having such structural and functional characteristics that overcome the limits of the prior art approaches discussed above by improving the hybrid propulsion vehicle performances and allowing smaller dimension propulsion systems to be formed.

The idea underlying the present invention is to manage in an innovative way the power output used for the propulsion of hybrid vehicles and to calculate the torque contributions of the two drive engines according to a predetermined number of operation parameters. These parameters may be associated with the vehicle and their respective engines. The two drive engines are the internal combustion engine and the electric engine.

Advantageously, the system according to the invention partially operates with predictive methods by processing through Fuzzy or Neuro-Fuzzy Logic Soft Computing techniques some "historical" data related to the operation of the vehicle and of the engines allowing the movement thereof.

In particular, an electronic torque control and distribution system for a hybrid propulsion vehicle is provided, wherein a drive thrust of the vehicle is distributed between an electric engine and an internal combustion engine through a transmission system delivering torque of both engines to wheels of the vehicle. The system may comprise a control unit for controlling the transmission system. A controller may be connected to the control unit and comprises a fuzzy logic processor for predicting through soft computing techniques torque contributions of the electric engine and of the internal combustion engine. A sensor is connected to the control unit for estimating polluting emissions from the vehicle.

BRIEF DESCRIPTION OF THE DRAWINGS

The features and advantages of the electronic torque control and distribution system according to the invention will be apparent from the following description of an embodiment thereof given by way of a nonlimiting example with reference to the attached drawings. In the drawings.

DETAILED DESCRIPTION OF THE PREFERRED EMBODIMENTS

Figure 1:
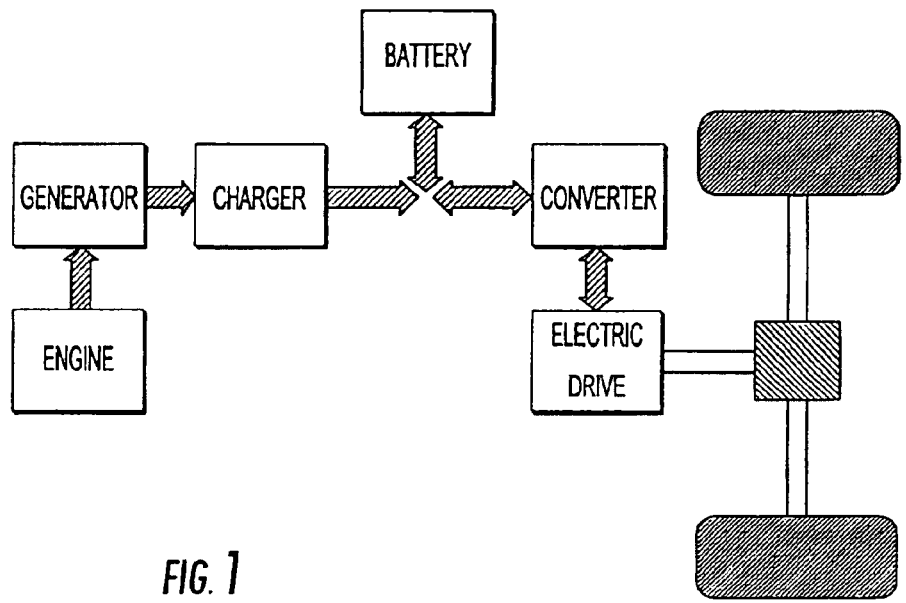
FIG. 1 is a block diagram of a vehicle equipped with a series configuration hybrid propulsion system according to the prior art.
Figure 2:
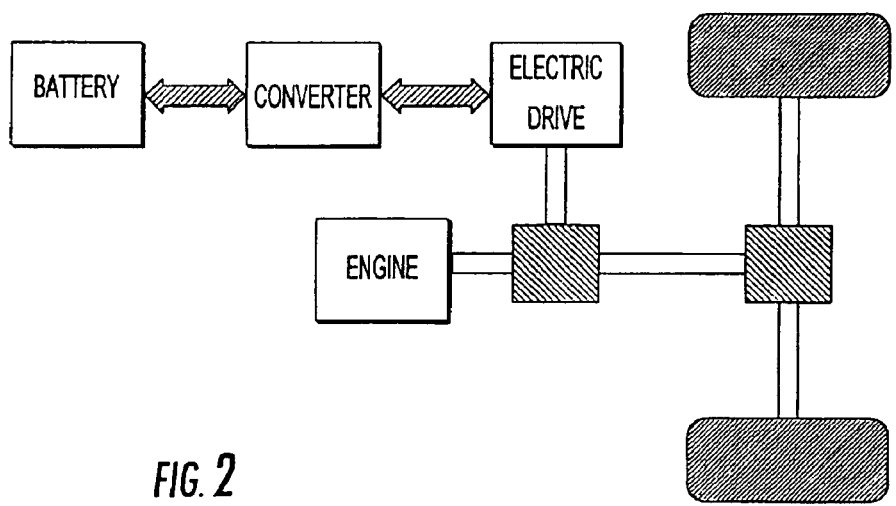
FIG. 2 is a block diagram of a vehicle equipped with a parallel configuration hybrid propulsion system according to the prior art.
Figure 3:
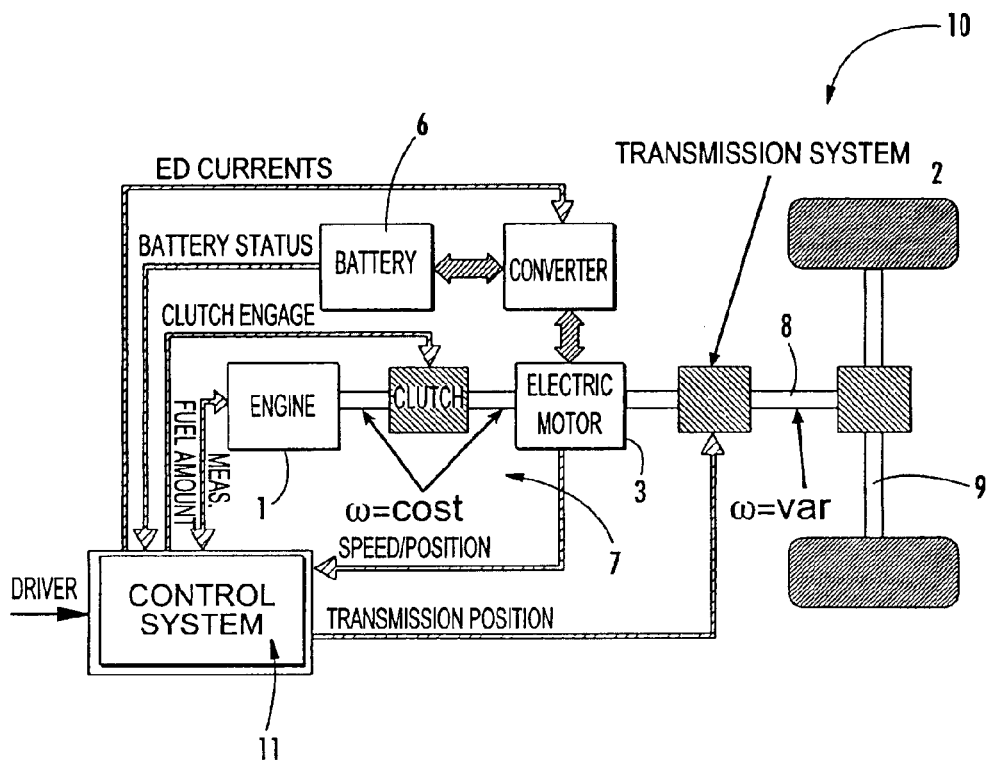
FIG. 3 is a block diagram of a vehicle equipped with a parallel configuration hybrid propulsion system in accordance with the present invention.

With reference to the drawings, and particularly to the examples of FIGS. 3 and 4, a vehicle 10 equipped with a parallel configuration hybrid propulsion system 7 will now be described. The electronic torque control and distribution system 11 formed according to the present invention is applied to the vehicle 10. Advantageously, the hybrid configuration of FIG. 3 is capable of combining the advantages of the two main types (series and parallel) of hybrid vehicles, as a result of an innovative management of power output.

From a classification point of view, the configuration according to the present invention can be incorporated in the parallel hybrid system types, in terms of both performance and size. In fact, as shown in FIG. 4, the vehicle 10 comprises an electric engine 3 which is drive assisted by an internal combustion engine 1. The internal combustion engine 1 is fuel fed by a tank 5 conventionally provided in the vehicle 1. Similarly, the electric engine 3 is powered by storage batteries 6.

Figure 4:
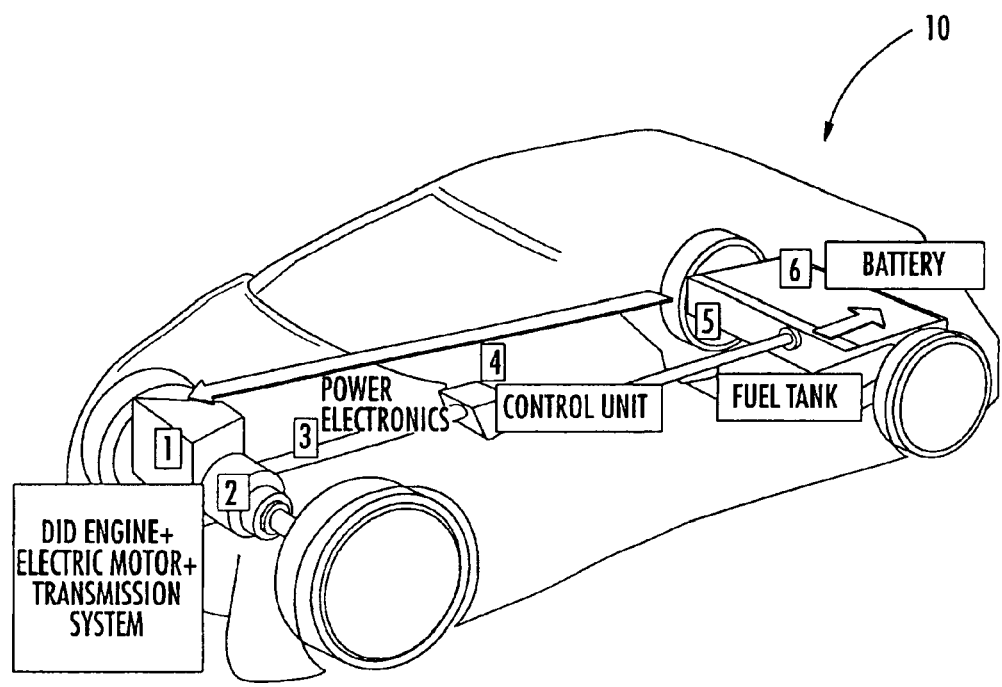
FIG. 4 is a perspective view of a hybrid propulsion vehicle that includes a control system according to the preset invention.

In FIG. 4 the tank 5 and the batteries 6 are positioned near the vehicle's 10 rear axle. This positioning is for illustrative purposes, and other locations within the vehicle 10 may be used. Similarly, the engine 1 and the electric engine 3 are shown near the vehicle's 10 front axle. This positioning is also for illustrative purposes, and other locations within the vehicle may be used. The front axle is shown in the example of FIG. 3 because this arrangement has been preferred to ensure a proper balance distribution in the vehicle 10.

Advantageously, the internal combustion engine 1 is sized on a power value lower than the known parallel hybrid systems. This reduced dimension also concerns the storage batteries 6. This results in a reduction in the vehicle 10 mass, which benefits performance.

In conventional parallel configurations, the combustion engine has a variable operating condition strictly linked to the driving dynamics, thus negatively affecting the consumption and emission levels. On the contrary, this problem cannot be noticed in the series configuration and it is solved by using the steady (angular and torque) state internal combustion engine, at an operation point having the highest efficiency. This is where the consumption and emissions are reduced to a minimum.

Advantageously, to obtain high efficiency and high torque at low speed, the choice of the engine 1 rests on a direct injection diesel engine associated with an electronic control unit 4 for adjusting the injection thereof, for example as described in the above referenced European patent application. Other types of internal combustion engine may be used, such as a common rail-type diesel engine for example. The control unit 4 is incorporated in the control system 11.

To couple the axis 8 of the angular steady state engine 1 with the wheel axis 9, having instead a variable angular speed according to driving conditions, it has been performed through a continuously variable reduction ratio transmission system or group 2.

Figure 8:
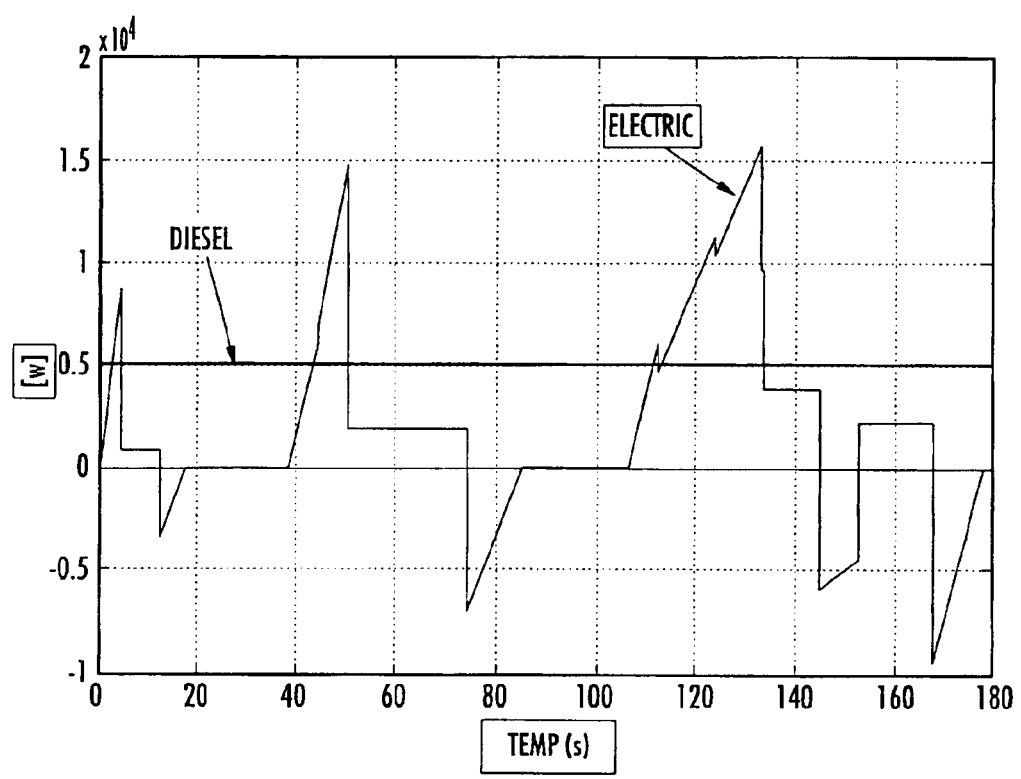
FIG. 8 is a graph of torque versus temperature for an example of the hybrid propulsion system operating according to the present invention.

The diesel engine 1 delivers, therefore, a constant power, adjusted to a driver demanded average power. FIG. 8 clearly shows how the diesel engine 1 torque is always steady, while the electric engine contribution varies according to necessity. The torque conversion is defined and determined by the control system 11 according to the invention which is incorporated in the control unit 4 and drives the transmission system 2.

The control unit 4 drives the operation as a generator or as a draft gear of the internal combustion engine 1, depending on whether the required mechanical power is lower or higher than the power delivered by the diesel engine 1. The control unit 4 also controls the power output to be distributed among the main components (electric machine, diesel engine and storage batteries) to optimize the overall energy efficiency of the whole system.

The structure of the transmission system 2 will now be briefly examined. The transmission system 2 comprises a continuously variable reduction ratio coupling, called continuously variable. The continuously variable transmission is definitely less complex than a traditional automatic transmission equipped with a torque converter.

The system 2 delivers the torque through a converter comprising a segmented steel belt connecting the engine to the transmission by rotating on expanding pulleys. The ratios change according to the changes imposed to the pulley diameter by a hydraulic system associated therewith. The control of this transmission is entirely electronic and allows the engine speed to be kept steady when the wheel speed is variable.

As already mentioned, according to the invention the torque control and distribution system 11 is incorporated in the control unit 4. This control system 11 has the advantages of the two main types of hybrid vehicles, i.e., series and parallel. The two main types of hybrid vehicles are advantageously combined due to an innovative management of radiant fluxes.

Figure 5:
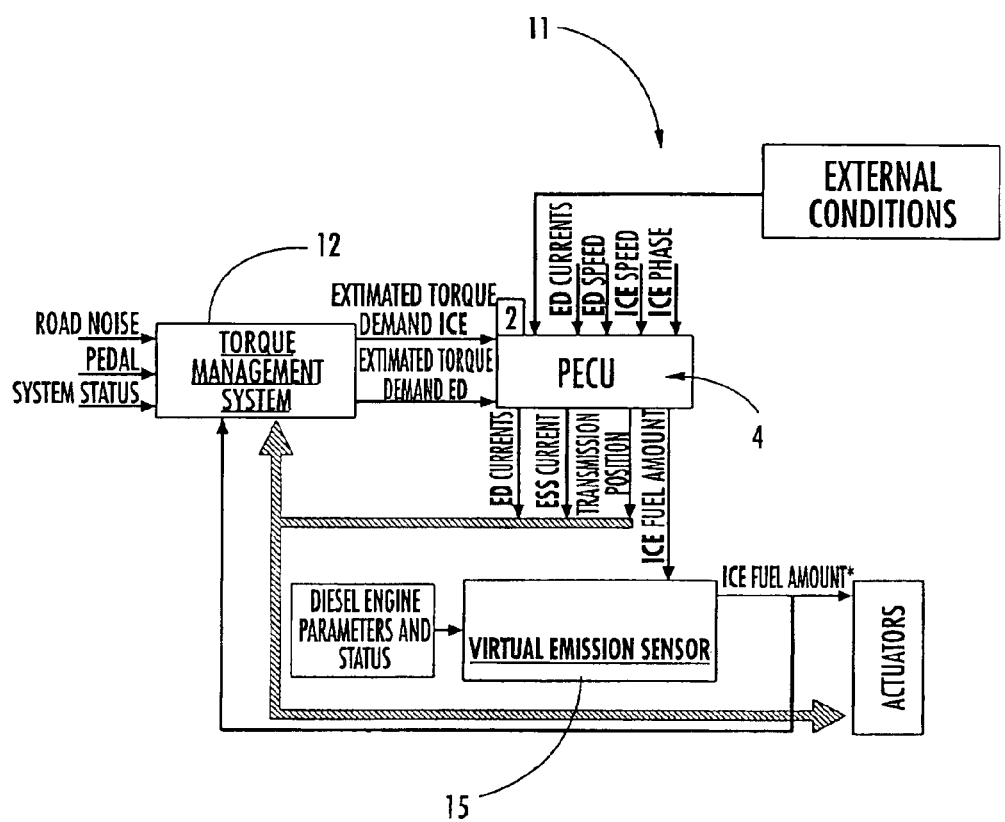
FIG. 5 is a block diagram of the torque control and distribution system according to the present invention.

The control system 11 schematically represented in FIG. 5 is based on soft computing techniques and essentially comprises three main blocks: 1) soft computing controller 12 for predicting the torque contributions of the electric engine 3 and of the diesel engine 1 (TMS); 2) programmable electronic control unit 4 (PECU); and 3) virtual sensor 15 for estimating polluting emissions (VES).

The first block 12 determines the contributions of the two engines 1, 3 to the overall drive torque according to the following electric signals received and feedback quantities: path profile (road noise); driving commands (pedals); system component status (system status); fuel mass capacity (ICE fuel amount); electric drive phase currents (ED currents); battery supplied current (ESS currents); and transmission system status (transmission position).

The power supply control algorithm of the two engines 1, 3 are stored in the control unit 4. These algorithms produce control signals required to adjust the operation thereof and to meet in real time the torque requests expressed by the controller 12. In this case, the control unit 4 input signals are as follows: electric drive phase currents (ED currents); electric machine angular speed (ED speed); thermal machine angular speed (ICE speed); thermal engine timing (ICE phase); external vehicle conditions, for example atmospheric pressure and temperature; torque requests outputted by block 12, i.e., the signals: Demand ICE and Demand ED;

The control unit 4 outputs are as follows: fuel mass capacity (ICE fuel amount); electric drive phase currents (ED currents); battery supplied current (ESS currents); and transmission system status (transmission position).

The third block 15 (VES) is a virtual sensor for estimating exhaust emissions with respect to the required fuel capacity, and based on machine parameters and rule limitations on emissions set thereto, it corrects the required fuel capacity. The fuel request issued by the control unit 4 is thus processed by the block 15 to estimate the vehicle 10 polluting emissions.

The control system 11 as a whole calculates the torque contributions of the two engines 1 and 3 while taking into account all the inputs and obtaining at the same time the following parametric information: system status, external requests and noise. It is now possible to obtain an estimate allowing the vehicle 10 operation to be optimized.

It is important to emphasis that the system 11 operates also in a predictive way since the estimates are performed by monitoring the present system status but also by interpreting the past history thereof. This is possible due to the presence in the system 11 of the fuzzy logic operating controller 12. The peculiar structure of fuzzy logic processors, which incorporate a nonvolatile memory comprising data and references to the processing already performed, allows estimate curves of the electric signals needed to drive the hybrid propulsion system to be obtained.

In other words, with the system 11 it is possible to predict the driving style by interpreting at predetermined time intervals the driving cycle already covered. By way of a straightforward embodiment, a possible real situation which might happen in using the above mentioned vehicle 10 will be analyzed below. In this example, the control is applied to the parallel configuration hybrid vehicle 10 wherein the torque to be delivered by the electric machine 3 is obtained by the driver demanded torque less the diesel engine torque.

The control system 11 core is the management of the torque delivered by the internal combustion engine 1. In this example the controller 12 comprises a fuzzy logic processor 13, such as the type commercially known as WARP III for example, whose inputs are the battery state-of-charge (soc) and the index cycle. The index cycle indicates a path calculated by the average and the variance of the vehicle speed. The variable cycle is recalculated at each predetermined time interval $\Delta t$. Moreover, a further variable time makes the output change slow at will.

Figure 6:
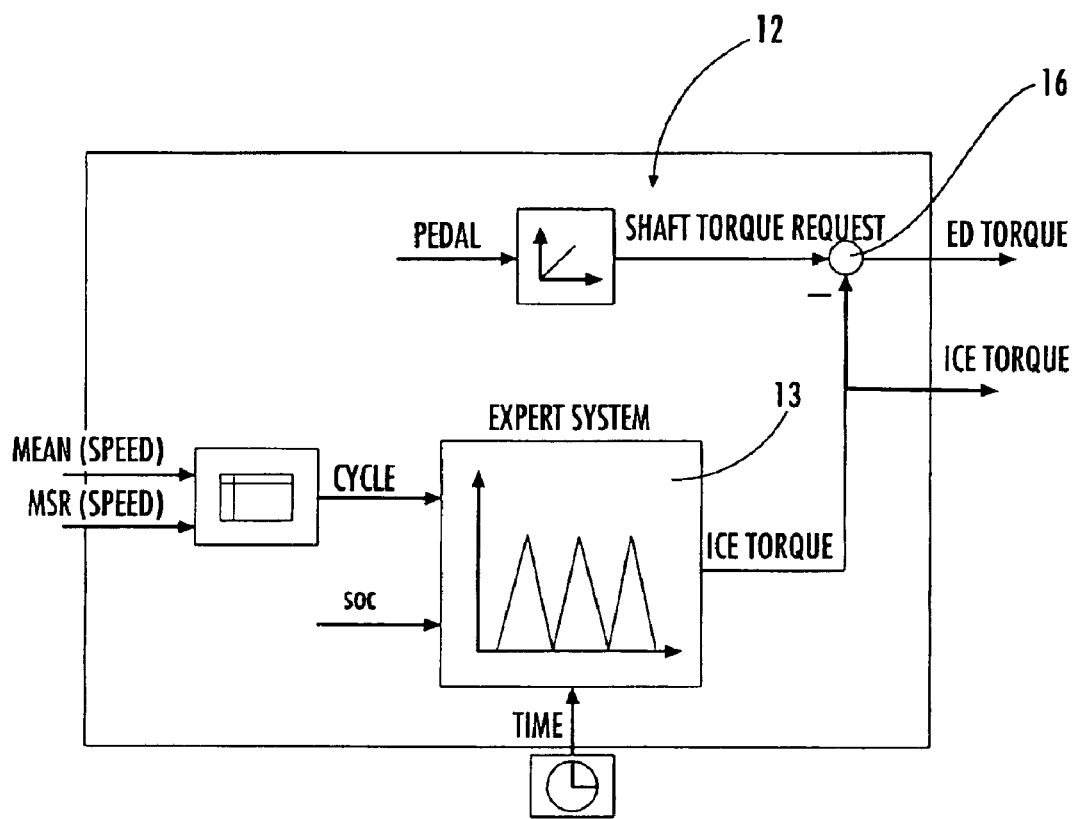
FIG. 6 is a detailed block diagram of the torque control and distribution system as shown in FIG. 5.

FIG. 6 schematically shows the fuzzy processor 13 incorporated in the controller 12 with the relevant inputs and the output addressed to a summing node 16. The output of a processing block 14 of the signal comes from the accelerator pedal also converging to the summing node 16.

As readily known by those skilled in the art, the fuzzy processor 13 operates on so-called membership functions associated to the inputs. The fuzzy inference rules which can be applied by way of example to the membership functions are as follows:

In this embodiment, the diesel engine 1 runs at a fixed speed and the power delivered therefrom is steady. The control system 11 acts so that the sum of the mechanical power delivered by the diesel engine 1 and the power delivered by the electric engine 3 is always equal to the driver demanded power.

This means that if the power delivered by the diesel engine 1 is higher than the required mechanical power, the electric machine 3 will operate as a generator, recovering and storing the excessive power in the batteries 6. If, on the contrary, the diesel engine 1 power is lower than the required power, the electric machine 3 will provide the remaining part consistently with the capacity of the batteries 6.

As far as batteries 6 are concerned, not having to operate as a real energy supply in the parallel hybrid configuration, but rather as a buffer in the electric engine 3 powering to reach the drive requested power peaks, the batteries have high specific power values and low specific energy values that can be conveniently used. For example, batteries incorporating metallic nickel-hydrides can be suitable to this purpose since they have low specific power values related to the weight unit. This procedure allows masses to be contained, and accordingly, performances to be improved for the same installed power.

Moreover, it must be taken into account that the internal combustion engine can always be excluded by the vehicle clutch, and that it is also turned off under conditions not requiring a high average power. These conditions include when the vehicle 10 is stopped at traffic lights or driving in limited traffic urban areas, etc. This allows the undesirable fuel consumption to be eliminated, and accordingly, the polluting emissions to be reduced and the overall efficiency to be increased.

It must be emphasized that depending on the control system 11, decisions therefrom will correspond to actions of the vehicle 10. More particularly, a series of actuators located with respect to the main control elements of the vehicle 10, like the clutch, the transmission system, etc., are slaved to corresponding control system 11 outputs.

Figure 7:
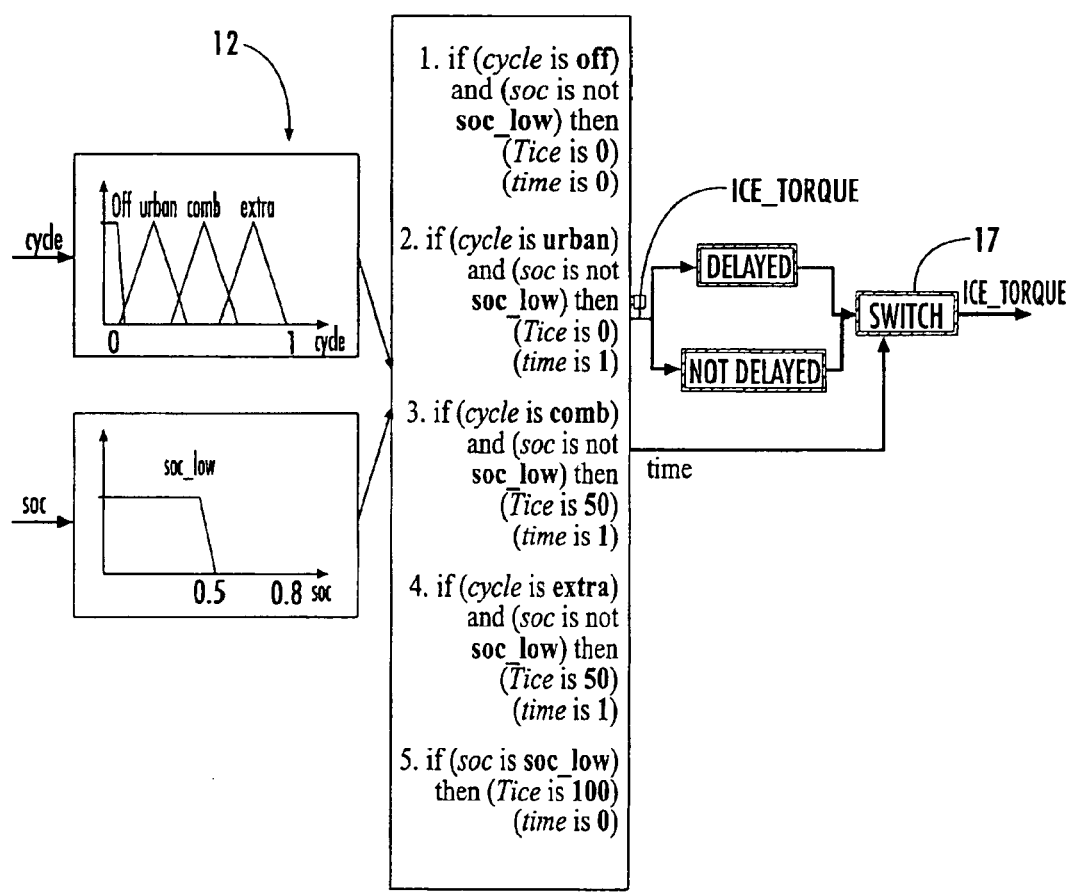
FIG. 7 is a diagram illustrating in greater detail a portion of the torque control and distribution system as shown in FIG. 5.

FIG. 7 lays out this control possibility by showing how the controller 12 incorporating the fuzzy processor 13 is capable of processing in fuzzy logic the input signals to output a control signal ICE_Torque to be applied to a predetermined actuator of the vehicle 10 through a controlled switch 17.

The presence of the switch 17 allows a predetermined time delay to be applied to the signal ICE_Torque according to necessity and in consideration of the timing signal time. For example, if the control system 11 delivers a signal ICE_Torque=0, the first macroscopic effect on the vehicle control will be the clutch disengagement and the subsequent decoupling of the internal combustion engine 1.

Moreover, if the variable time, which can have logic values 0 and 1, shows that the calculated torque value ICE_torque must be imposed to the torque control, or conveniently delayed to avoid abrupt transients, the switch 17 will provide for the switch of the conduction path through which the signal ICE_torque passes.

The torque control and distribution system according to the invention, applied to a parallel hybrid configuration combines the advantages of the two hybrid vehicle base configurations, allowing the thermal machine to operate at a steady state as in the series configuration, and in the meantime two different drive engines are present as in the parallel configuration. Moreover, the optimum determination of the torque distribution through soft computing techniques allows the system overall efficiency to be considerably improved and emissions reduced. In fact, a prediction on the torque distribution is even possible with no need to previously know the path and driving condition features.

That which is claimed is:

1. An electronic torque control and distribution system for a hybrid propulsion vehicle wherein a drive thrust of the vehicle is distributed between an electric engine and an internal combustion engine through a transmission system delivering torque of both engines to wheels of the vehicle, the system comprising:
    a control unit for controlling the transmission system;
    a controller connected to said control unit and comprising a fuzzy logic processor for predicting through soft computing techniques torque contributions of the electric engine and of the internal combustion engine; and
    a sensor connected to said control unit for estimating polluting emissions from the vehicle.

2. A system according to claim 1, wherein said controller and said control unit receive as input a predetermined number of operating parameters of the vehicle and of the engines, and respectively comprise control outputs for actuator elements of the vehicle and for the engines; and wherein said controller further comprises a control output for providing a torque request to said control unit.

3. A system according to claim 2, wherein the actuator elements of the vehicle comprise at least one of a clutch and the transmission system.

4. A system according to claim 2, wherein said controller receives at least one of the following inputs: path profiles, driving commands, system component status, fuel mass capacity, electric drive phase currents, battery supplied current, and transmission system status.

5. A system according to claim 1, wherein the internal combustion engine operates at steady state, and wherein additional torque required by the vehicle is provided by the electric engine.

6. A system according to claim 1, wherein the vehicle comprises batteries for supplying energy to the electric engine; and wherein said fuzzy logic processor in said controller receives as input at least one of a state-of-charge signal of the batteries supplying the electric engine and a signal indicating a path calculated based upon an average and variance of the vehicle speed.

7. A system according to claim 6, wherein the signal indicating the calculated path is recalculated at predetermined time intervals.

8. A system according to claim 1, wherein said control unit receives the following inputs: electric drive phase currents, electric machine angular speed, thermal machine angular speed, thermal engine timing, out-vehicle conditions, and a torque requests output by said controller.

9. A system according to claim 6, wherein said fuzzy logic processor operates on membership functions according to the following fuzzy inference rules:
    A) if (cycle is off) and (soc is not soc_low) then (Tice is 0) (time is 0);
    B) if (cycle is urban) and (soc is not soc_low) then (Tice is 0) (time is 1);
    C) if (cycle is comb) and (soc is not soc_low) then (Tice is 50) (time is 1);
    D) if (cycle is extra) and (soc is not soc_low) then (Tice is 50) (time is 1); and
    E) if (soc is soc_low) then (Tice is 100) (time is 0);
    wherein cycle is the signal indicating the path calculated based upon an average and variance of the vehicle speed, and soc is the signal of the batteries supplying the electric engine.

10. A system according to claim 1, wherein said control unit provides an output signal defining a fuel capacity required for the internal combustion engine, with the output signal being provided through said sensor.

11. A system according to claim 1, wherein the predicting is performed by monitoring a present vehicle state and a past history related to driving conditions based upon data stored in said controller.

12. A hybrid propulsion vehicle comprising:
    an electric engine;
    an internal combustion engine;
    at least one axle;
    a transmission system delivering torque from said electric energy and said internal combustion engine to said at least one axle; and
    an electronic torque control and distribution system comprising
        a control unit for controlling said transmission system,
        a controller connected to said control unit and comprising a fuzzy logic processor for predicting contributions of said electric engine and of said internal combustion engine, and
        a sensor connected to said control unit for estimating polluting emissions from the vehicle.

13. A vehicle according to claim 12, further comprising at least one actuator element; wherein said controller and said control unit receive as input a predetermined number of operating parameters of the vehicle and of said engines, and respectively comprise control outputs for said at least one actuator element and for said engines; and wherein said controller further comprises a control output for providing a torque request to said control unit.

14. A vehicle according to claim 13, wherein said at least one actuator element comprises a clutch.

15. A vehicle according to claim 13, wherein said controller receives at least one of the following inputs: path profiles, driving commands, system component status, fuel mass capacity, electric drive phase currents, battery supplied current, and transmission system status.

16. A vehicle according to claim 12, wherein said internal combustion engine operates at steady state, and wherein additional torque required by the vehicle is provided by said electric engine.

17. A vehicle according to claim 12, further comprising at least one battery for supplying energy to said electric engine; and wherein said fuzzy logic processor in said controller receives as input at least one of a state-of-charge signal of said at least one battery supplying said electric engine and a signal indicating a path calculated based upon an average and variance of the vehicle speed.

18. A vehicle according to claim 17, wherein the signal indicating the calculated path is recalculated at predetermined time intervals.

19. A vehicle according to claim 12, wherein said control unit receives the following inputs: electric drive phase currents, electric machine angular speed, thermal machine angular speed, thermal engine timing, out-vehicle conditions, and a torque requests output by said controller.

20. A vehicle according to claim 17, wherein said fuzzy logic processor operates on membership functions according to the following fuzzy inference rules:

A) if (cycle is off) and (soc is not soc_low) then (Tice is 0) (time is 0)

B) if (cycle is urban) and (soc is not soc_low) then (Tice is 0) (time is 1);

C) if (cycle is comb) and (soc is not soc_low) then (Tice is 50) (time is 1);

D) if (cycle is extra) and (soc is not soc_low) then (Tice is 50) (time is 1); and E) if (soc is soc_low) then (Tice is 100) (time is 0);

wherein cycle is the signal indicating the path calculated based upon an average and variance of the vehicle speed, and soc is the signal of the batteries supplying the electric engine.

21. A vehicle according to claim 22, wherein said control unit provides an output signal defining a fuel capacity required for said internal combustion engine, the output signal being provided via said sensor.

22. A vehicle according to claim 12, wherein the predicting is performed by monitoring a present vehicle state and a past history related to driving conditions based upon data stored in said controller.

23. A method for providing electronic torque control and distribution in a hybrid propulsion vehicle wherein a drive thrust of the vehicle is distributed between an electric engine and an internal combustion engine through a transmission system delivering torque of both engines to wheels of the vehicle, the method comprising:

controlling the transmission system using a control unit;

predicting torque contributions of the electric engine and of the internal combustion engine using a controller connected to the control unit, the controller comprising a fuzzy logic processor for performing the predicting through soft computing techniques; and estimating polluting emissions from the vehicle using a sensor connected to the control unit.

24. A method according to claim 23, wherein the controller and the control unit receive as input a predetermined number of operating parameters of the vehicle and of the engines, and respectively comprise control outputs for actuator elements of the vehicle and for the engines; and wherein the controller further comprises a control output for providing a torque request to the control unit.

25. A method according to claim 24, wherein the actuator elements of the vehicle comprise at least one of a clutch and the transmission system.

26. A method according to claim 24, wherein said controller receives at least one of the following inputs: path profiles, driving commands, system component status, fuel mass capacity, electric drive phase currents, battery supplied current, and transmission system status.

27. A method according to claim 23, wherein the internal combustion engine operates at steady state, and wherein additional torque required by the vehicle is provided by the electric engine.

28. A method according to claim 23, wherein the vehicle comprises batteries for supplying energy to the electric engine; and wherein the fuzzy logic processor in the controller receives as input at least one of a state-of-charge signal of the batteries supplying the electric engine and a signal indicating a path calculated based upon an average and variance of the vehicle speed.

29. A method according to claim 28, wherein the signal indicating the calculated path is recalculated at predetermined time intervals.

30. A method according to claim 23, wherein the control unit receives the following inputs: electric drive phase currents, electric machine angular speed, thermal machine angular speed, thermal engine timing, out-vehicle conditions, and a torque requests output by said controller.

31. A method according to claim 28, wherein the fuzzy logic processor operates on membership functions according to the following fuzzy inference rules:

A) if (cycle is off) and (soc is not soc_low) then (Tice is 0) (time is 0);

B) if (cycle is urban) and (soc is not soc_low) then (Tice is 0) (time is 1);

C) if (cycle is comb) and (soc is not soc_low) then (Tice is 50) (time is 1);

D) if (cycle is extra) and (soc is not soc_low) then (Tice is 50) (time is 1); and E) if (soc is soc_low) then (Tice is 100) (time is 0);

wherein cycle is the signal indicating the path calculated based upon an average and variance of the vehicle speed, and soc is the signal of the batteries supplying the electric engine.

32. A method according to claim 23, wherein the control unit provides an output signal defining a fuel capacity required for the internal combustion engine, with the output signal being provided through the sensor.

33. A method according to claim 23, wherein the predicting is performed by monitoring a present vehicle state and a past history related to driving conditions based upon a plurality of data stored in said controller.

* * * * *

UNITED STATES PATENT AND TRADEMARK OFFICE
CERTIFICATE OF CORRECTION

PATENT NO. : 6,853,893 B2
APPLICATION NO. : 10/696741
DATED : February 8, 2005
INVENTOR(S) : Corcione et al.

It is certified that error appears in the above-identified patent and that said Letters Patent is hereby corrected as shown below:

In the Drawings:    Delete: FIG. 5
Insert: New FIG. 5

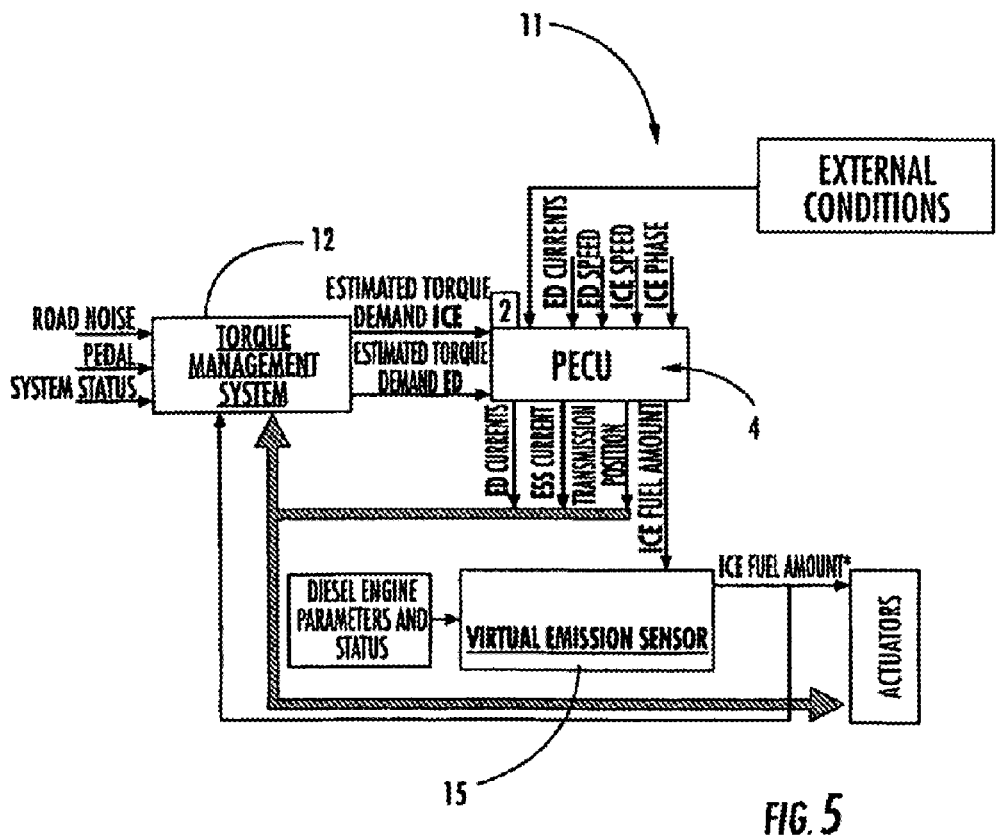

UNITED STATES PATENT AND TRADEMARK OFFICE
CERTIFICATE OF CORRECTION

PATENT NO. : 6,853,893 B2
APPLICATION NO. : 10/696741
DATED : February 8, 2005
INVENTOR(S) : Corcione et al.

It is certified that error appears in the above-identified patent and that said Letters Patent is hereby corrected as shown below:

Column 1, Line 38          Delete: "petrol"
                           Insert: --gasoline--

Column 3, Line 48          Delete: "preset"
                           Insert: --present--

Column 5, Line 21          Delete: "radiant fluxes"
                           Insert: --power output--

Column 5, Line 47          Delete: "ED;"
                           Insert: --ED.--

Column 5, Line 66          Delete: "emphasis"
                           Insert: --emphasize--

Column 9, Line 49          Delete: "claim 22"
                           Insert: --claim 12--

Signed and Sealed this

Eighth Day of January, 2008

JON W. DUDAS
*Director of the United States Patent and Trademark Office*